UNITED STATES PATENT OFFICE.

MORITZ ULRICH, OF ELBERFELD, GERMANY, ASSIGNOR TO THE FARBENFABRIKEN OF ELBERFELD COMPANY, OF NEW YORK.

YELLOW DYE AND PROCESS OF MAKING SAME.

SPECIFICATION forming part of Letters Patent No. 619,518, dated February 14, 1899.

Application filed July 26, 1898. Serial No. 686,960. (No specimens.)

*To all whom it may concern:*

Be it known that I, MORITZ ULRICH, doctor of philosophy, chemist, residing at Elberfeld, Germany, (assignor to the FARBENFABRIKEN OF ELBERFELD COMPANY, of New York,) have invented a new and useful Improvement in Yellow Dye; and I hereby declare the following to be a clear and exact description of my invention.

My invention relates to the production of new yellow dyestuffs for cotton by combining the tetrazo derivatives of diamidodibenzyldisulfo acid having the formula

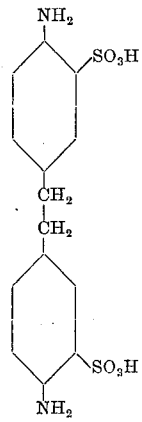

(which is produced by reducing the dinitrodibenzyldisulfo acid that is described *Berichte der Deutschen Chemischen Gesellschaft*, Vol. 30, p. 3099,) with a nitrometadiamin of the benzene series—such as nitrometaphenylenediamin, (see *Berichte*, Vol. 7, p. 1259,) nitrometatoluylenediamin, (see *Berichte*, Vol. 8, p. 1211, and Vol. 3, p. 219.)

In carrying out my new process practically I can proceed as follows, (the parts being by weight:) Thirty-seven parts of diamidodibenzyldisulfo acid are diazotized in the usual manner by means of fourteen parts of sodium nitrite and forty-five parts of concentrated hydrochloric acid, (containing 36.5 per cent. of HCl.) To the resulting tetrazo solution a boiling solution prepared from thirty-five parts of nitrometaphenylenediamin, thirty-five parts of concentrated hydrochloric acid, and fifteen hundred parts of water is added while well stirring. The reaction mixture is further stirred for about six hours at about 60° centigrade. Subsequently it is filtered, and the residue remaining on the filter is dissolved with the aid of a hot sodium-carbonate solution. From the resulting solution the finished dyestuff is separated by adding a hot solution of common salt. Finally the coloring-matter is filtered, pressed, dried, and pulverized. It is the sodium salt of an acid having the formula:

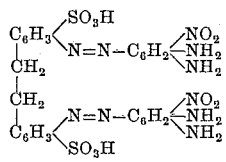

and is an orange-red powder, soluble in hot water with a yellow color, which is not changed by the addition of ammonia. By concentrated sulfuric acid it is dissolved with a yellowish-brown color, from which solution an orange-red gelatinous precipitate is obtained on the addition of a suitable quantity of ice.

The new coloring-matter dyes unmordanted cotton bright yellow shades, which are fast to alkalies and acids.

On replacing nitrometaphenylenediamin, used in the above example, by nitrometatoluylenediamin a coloring-matter is obtained which likewise exhibits the properties above described.

Having now described my invention and in what manner the same is to be performed, what I claim as new, and desire to secure by Letters Patent, is—

1. The process for the production of new tetrazo dyestuffs by combining one molecule of a tetrazo derivative of diamidodibenzyldisulfo acid having the formula:

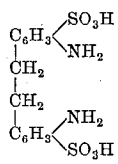

with two molecules of a nitrometadiamin of the benzene series, substantially as hereinbefore described.

2. The process for the production of a new tetrazo dyestuff by combining one molecule of a tetrazo derivative of diamidodibenzyldisulfo acid with two molecules of nitrometaphenylenediamin, substantially as hereinbefore described.

3. As a new article of manufacture the new dyestuffs, being alkaline salts of an acid having the formula:

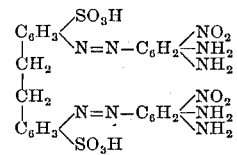

which are orange-red powders soluble in hot water with a yellow color, being dissolved by concentrated sulfuric acid with a yellowish-brown color from which solution an orange-red gelatinous precipitate is obtained on the addition of a suitable quantity of ice, dyeing unmordanted cotton bright yellow shades which are fast to alkalies and acids, substantially as hereinbefore described.

4. As a new article of manufacture the new dyestuff being an alkaline salt of an acid having the formula:

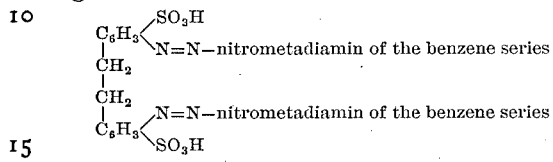

which is an orange-red powder, soluble in hot water with a yellow color which is not changed by the addition of ammonia, being dissolved by concentrated sulfuric acid with a yellowish-brown color from which solution an orange-red gelatinous mass is obtained on the addition of a suitable quantity of ice, dyeing unmordanted cotton bright yellow shades which are fast to alkalies and acids.

In testimony whereof I have signed my name in the presence of two subscribing witnesses.

MORITZ ULRICH.

Witnesses:
R. E. JAHN,
OTTO KÖNIG.